US 8,417,671 B1

(12) United States Patent
Swift et al.

(10) Patent No.: US 8,417,671 B1
(45) Date of Patent: Apr. 9, 2013

(54) BACKUP SYSTEM INCLUDING A PRIMARY BACKUP SERVER ACCESSIBLE VIA A VPN AND AN ALTERNATE BACKUP SERVER ACCESSIBLE VIA THE INTERNET

(75) Inventors: Jeremy Dean Swift, Plymouth, MN (US); Jeremy Howard Wartnick, Minnetonka, MN (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/553,339

(22) Filed: Jul. 19, 2012

Related U.S. Application Data (63) Continuation of application No. 12/494,001, filed on Jun. 29, 2009.

(51) Int. Cl.
| | |
|---|---|
| *G06F 7/00* | (2006.01) |
| *G06F 17/00* | (2006.01) |
| *G06F 12/00* | (2006.01) |
| *G06F 9/26* | (2006.01) |
| *G06F 9/34* | (2006.01) |
| *G06F 15/16* | (2006.01) |

(52) U.S. Cl. ........................................ 707/640; 711/162
(58) Field of Classification Search .................. 707/640; 711/162
See application file for complete search history.

(56) References Cited

U.S. PATENT DOCUMENTS

| | | | |
|---|---|---|---|
| 7,529,785 B1 | 5/2009 | Spertus et al. |
| 7,631,220 B1 | 12/2009 | Hamilton et al. |
| 7,689,859 B2 | 3/2010 | Westenberg |
| 7,702,824 B2 | 4/2010 | Rossi |
| 7,702,867 B2 | 4/2010 | Coombs et al. |
| 7,711,947 B2 | 5/2010 | Smith et al. |
| 2004/0030852 A1 | 2/2004 | Coombs et al. |
| 2004/0117344 A1 | 6/2004 | Yang |
| 2005/0278493 A1 | 12/2005 | Lin et al. |
| 2006/0041539 A1 | 2/2006 | Matchett et al. |
| 2007/0050575 A1 | 3/2007 | Uratani et al. |
| 2008/0270490 A1 | 10/2008 | Watterott et al. |

*Primary Examiner* — Greta Robinson
*Assistant Examiner* — Brian E. Weinrich
(74) *Attorney, Agent, or Firm* — Meyertons, Hood, Kivlin, Kowert & Goetzel, P.C.

(57) ABSTRACT

A system and method for backing up data from a client computer system are described. The system may include the client computer system, a primary backup server computer system, and an alternate backup server computer system. The primary backup server computer system may be privately accessible to the client computer system via a virtual private network (VPN). The alternate backup server computer system may be accessible to the client computer system via a public or open network such as the Internet. The client computer system may be configured to backup a first set of data to the alternate backup server computer system at a particular time via the Internet in response to determining that the client computer system is not connected to the VPN at the particular time.

18 Claims, 6 Drawing Sheets

BACKUP SYSTEM INCLUDING A PRIMARY BACKUP SERVER ACCESSIBLE VIA A VPN AND AN ALTERNATE BACKUP SERVER ACCESSIBLE VIA THE INTERNET

PRIORITY INFORMATION

This application is a continuation of, and claims priority to, U.S. patent application Ser. No. 12/494,001, entitled "BACKUP SYSTEM INCLUDING A PRIVATELY ACCESSIBLE PRIMARY BACKUP SERVER AND A PUBLICLY ACCESSIBLE ALTERNATE BACKUP SERVER", filed Jun. 29, 2009.

BACKGROUND OF THE INVENTION

1. Field of the Invention

This invention relates to data backup software for computer systems. More particularly, the invention relates to a system and method for backing up data from a client computer system to an alternate backup server computer system when a connection to a primary backup server computer system is unavailable.

2. Description of the Related Art

Computer systems often employ backup solutions to backup data in order to protect it against hardware failure or data corruption. Data may be stored on a storage device of a computer system in the form of files. Backup techniques for backing up the files generally operate to copy the files to a different backup storage device. One general backup technique is to backup the files at the file level, e.g., to copy each file to the backup storage device on a file-by-file basis. Another general backup technique is to backup the backup the files at the storage device block level rather than on a file-by-file basis. In this technique, the blocks may be sequentially read from the disk drive or other storage device on which the files are stored and written to the backup storage device.

Large organizations often include many users, each of whom uses a different client computer system. It may be necessary or desirable to backup data stored on each user's client computer system to a backup server, e.g., where the backup server is located within a data center maintained by the organization.

SUMMARY

Various embodiments of a system and method for backing up data from a client computer system are described herein. According to some embodiments, the system may include the client computer system, a primary backup server computer system, and an alternate backup server computer system. The primary backup server computer system may be privately accessible to the client computer system via a virtual private network (VPN). The alternate backup server computer system may be accessible to the client computer system via a public or open network such as the Internet.

The client computer system may be configured to backup a first set of data to the alternate backup server computer system at a particular time via the Internet in response to determining that the client computer system is not connected to the VPN at the particular time.

The primary backup server computer system may be configured to receive a notification indicating that the first set of data was backed up to the alternate backup server computer system, and communicate with the alternate backup server computer system to copy the first set of data onto the primary backup server computer system in response to the notification.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
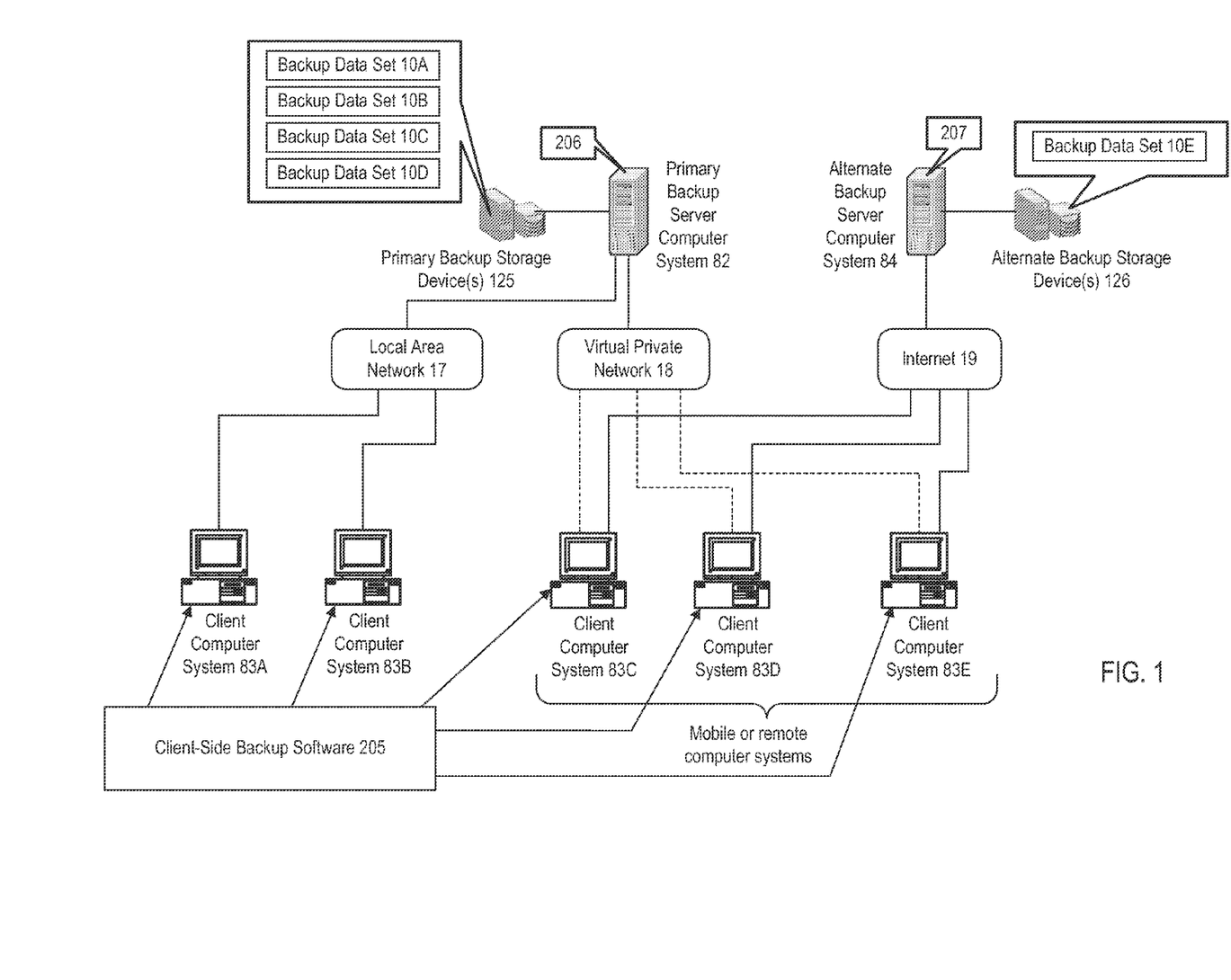
FIG. 1 illustrates one example embodiment of a system configured to backup data from one or more client computer systems.

Various embodiments of a system and method for backing up data from one or more client computer systems are described herein. FIG. 1 illustrates one example embodiment of the system. In this embodiment the system includes a plurality of client computer systems 83A-E. In various embodiments the system may include any number and any type of client computer systems 83. Each client computer 83 may be used by a particular user or member of a business or other organization. It may be desirable to periodically backup data stored on each client computer system 83 to a primary backup server computer system 82, e.g., at scheduled backup intervals.

Because the organization's data may be sensitive, the primary backup server computer system 82 may be privately accessible only to computer systems associated with the organization. In some embodiments, some of the client computer systems 83 may access the primary backup server computer system 82 through a private local area network (LAN) 17, e.g., as shown for the client computer systems 83A and 83B in FIG. 1. For example, the client computer systems 83A may be desktop computer systems or other computer systems that typically remain in a fixed location and have constant access to the LAN 17, or may be mobile computer systems temporarily connected to the LAN 17.

Other client computer systems 83 may access the primary backup server computer system 82 through a virtual private network (VPN) 18, e.g., as shown for the client computer systems 83C, 83D and 83E in FIG. 1. As used herein, the term "virtual private network" refers to a private (not publicly accessible) computer network in which some of the links between nodes on the network are carried by open connections or virtual circuits in larger networks (such as the Internet), e.g., as opposed to all the links running across a single private network. The VPN may be configured so that a client computer system 83 is required to provide authentication information (e.g., a username and password) in order to connect to the VPN. Thus, the primary backup server computer system 82 may be protected from being accessed through the VPN by other computer systems not associated with the organization since these computers (and their users) do not have the authentication information needed to connect to the VPN.

In some embodiments the client computer systems 83 that connect to the primary backup server computer system 82 through the VPN 18 may be remote computer systems that do not have access to the organization's LAN 17, and/or may be mobile computing devices such as laptop computer systems, personal digital assistants, etc.

Each of the client computer systems 83 may execute client-side backup software 205. The client-side backup software 205 on a given client computer system 83 may be executable to backup data from the client computer system 83 to the primary backup server computer system 82, e.g., by performing backup operations at scheduled intervals. The primary backup server computer system 82 may execute primary server backup software 206 which communicates with the client-side backup software 205 executing on the various client computer systems 83 to receive the backup data and store it on one or more primary backup storage device(s) 125. A respective backup data set 10 may be created and stored on the primary backup storage device(s) 125 in response to each backup operation. In the example of FIG. 1, four backup data sets 10A-D have been stored on the primary backup storage device(s) 125. For example, the backup data set 10A may include data backed up from one of the client computer systems 83 in a first backup operation, the backup data set 10B may include data backed up from one of the client computer systems 83 in a second backup operation, etc. In addition to the data received from a respective client computer system 83 during a respective backup operation, each backup data set 10 may also include other information, e.g., metadata specifying which client computer system 83 (or which user) the backup data set 10 was received from, the time the respective backup operation was performed, etc. Since a given client computer system 83 may perform multiple backup operations over time, multiple backup data sets 10 associated with the given client computer system 83 may be stored on the primary backup storage device(s) 125.

In many cases, a particular client computer system 83 that accesses the primary backup server computer system 82 through the VPN 18 may not be constantly connected to the VPN 18. Thus, one or more of the VPN connections illustrated in FIG. 1 may be temporary and unavailable much of the time. For example, the user of a particular mobile client computer system 83 may only occasionally connect to the VPN 18 for short periods of time when the user needs access to email servers, file servers, or other computing resources provided by the organization. This may result in little or no time for the data of the mobile client computer system 83 to be backed up to the primary backup server computer system 82. Furthermore, the client computer system's connection to the VPN 18 may be limited in bandwidth. Thus, even if there is time to perform a backup to the primary backup server computer system 82 via the VPN 18, it may be undesirable to do so since this may cause the VPN connection to become saturated with transmitted backup data when the VPN connection is needed for things that are more critical.

The system may address these problems by providing one or more additional alternate backup server computer systems 84 that are accessible via a publicly accessible or open network such as the Internet without requiring them to be accessed through the VPN 18. For example, in FIG. 1, each client computer system 83 that uses the VPN 18 to connect to the primary backup server computer system 82 is also shown as being connected to the alternate backup server computer system 84 through the Internet 19. If a given client computer system 83 is not currently connected to the VPN 18 at a time when a backup operation is scheduled then the client-side backup software 205 may instead communicate through the Internet 19 with alternate server backup software 207 executing on the alternate backup server computer system 84 in order to backup the data from the client computer system 83 to the alternate backup server computer system 84. For example, as illustrated in FIG. 1, the alternate server backup software 207 has stored a backup data set 10E on one or more alternate backup storage device(s) 126 in response to a backup operation performed in conjunction with one of the client computer systems 83.

Since many of the client computer systems 83 may be constantly or usually connected to the Internet, they may have access to the alternate backup server computer system 84 for longer periods of time than the primary backup server computer system 82. The client computer systems' Internet connections may also have more available bandwidth than their VPN connections. Thus it may be easier for the client computer systems 83 to backup their data to the alternate backup server computer system 84 than to the primary backup server computer system 82.

In various embodiments the client computer systems 83 may access the alternate backup server computer system 84 through the Internet using any of various techniques or protocols. For example, in some embodiments the alternate backup server computer system 84 may provide a Software As a Service (SaaS) interface through which backup operations can be performed. As another example, in some embodiments the client computer systems 83 may utilize File Transport Protocol (FTP) or another Internet-based protocol to transmit the backup data sets to the alternate backup server computer system 84. It is noted that in some embodiments the alternate backup server computer system 84 may require the client computer systems 83 to provide authentication information (e.g., a username and password) before they are allowed to backup data to or access data on the alternate backup server computer system 84. Thus, even though the alternate backup server computer system 84 may be accessible by all computers on a public network such as the Internet, the alternate backup server computer system 84 may still be somewhat protected from unauthorized access.

Figure 2:
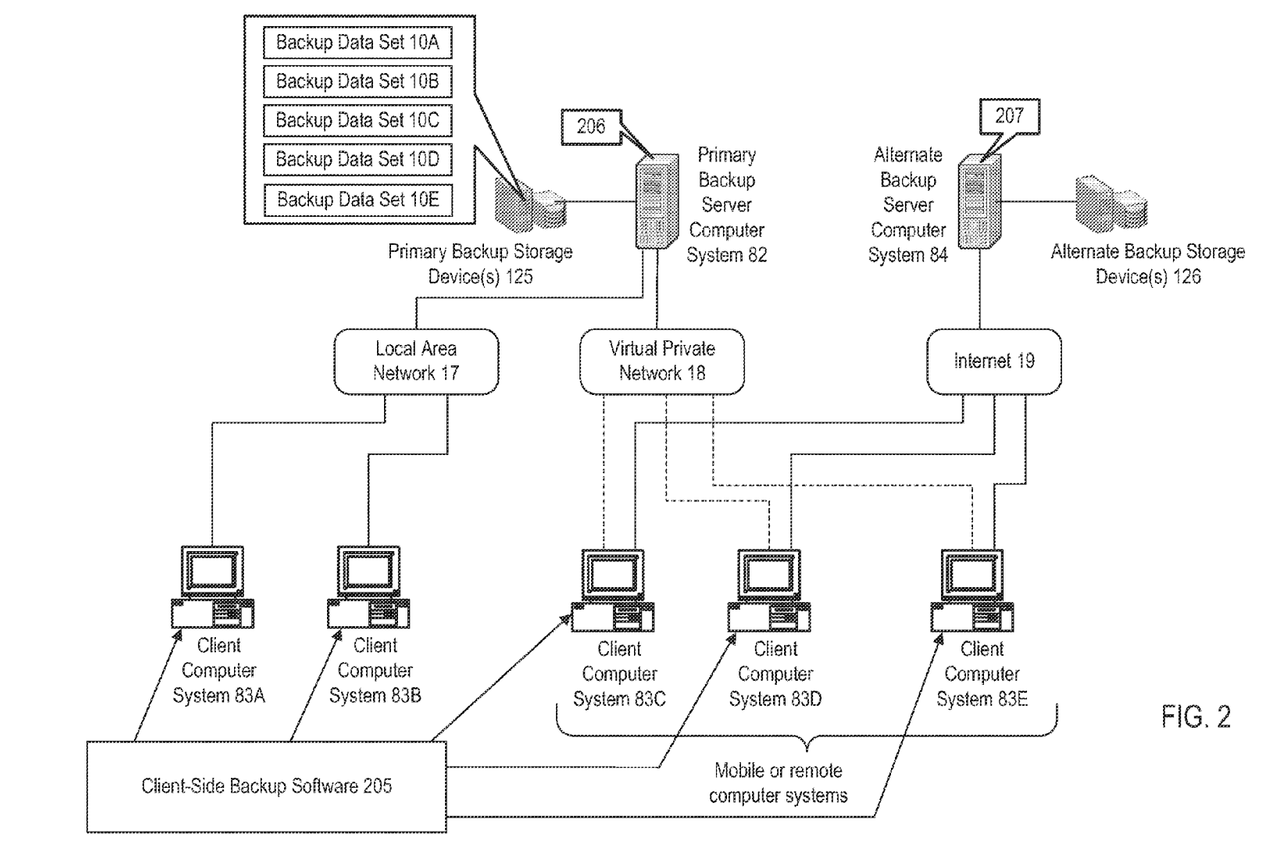
FIG. 2 illustrates the system of FIG. 1 at a later point in time.

In some embodiments the alternate backup server computer system 84 may act as a temporary location for the backup data sets 10 that it creates. For example, after each respective backup data set 10 has been created by the alternate backup server computer system 84, the respective backup data set 10 may be subsequently transferred or copied to the primary backup server computer system 82 and deleted from the alternate backup server computer system 84. For example, FIG. 2 illustrates the system of FIG. 1 at a later point in time after the backup data set 10E originally stored on the alternate backup storage device(s) 126 of the alternate backup server computer system 84 has been transferred to the primary backup storage device(s) 125 of the primary backup server computer system 82. In this example the backup data set 10E has also been deleted from the alternate backup storage device(s) 126. In other embodiments the backup data set 10E may remain on the alternate backup server computer system 84 even after it has been copied to the primary backup server computer system 82. This may provide increased data redundancy for data sets backed up to the alternate backup server computer system 84. In still other embodiments the system may not transfer the backup data sets 10 originally created on the alternate backup server computer system 84 to the primary backup server computer system 82.

In order to further safeguard the backup data sets 10 created on the alternate backup server computer system 84, in some embodiments these backup data sets 10 may be stored on the alternate backup server computer system 84 in an encrypted form. For example, the client-side backup software 205 from which a given backup data set originates may encrypt the data set before transmitting it to the alternate backup server computer system 84. In other embodiments the client-side backup software 205 may also or may alternatively digitally sign the data set before transmitting it to the alternate backup server computer system 84. Any of various algorithms may be used to encrypt and/or digitally sign the data sets in various embodiments.

Figure 3:
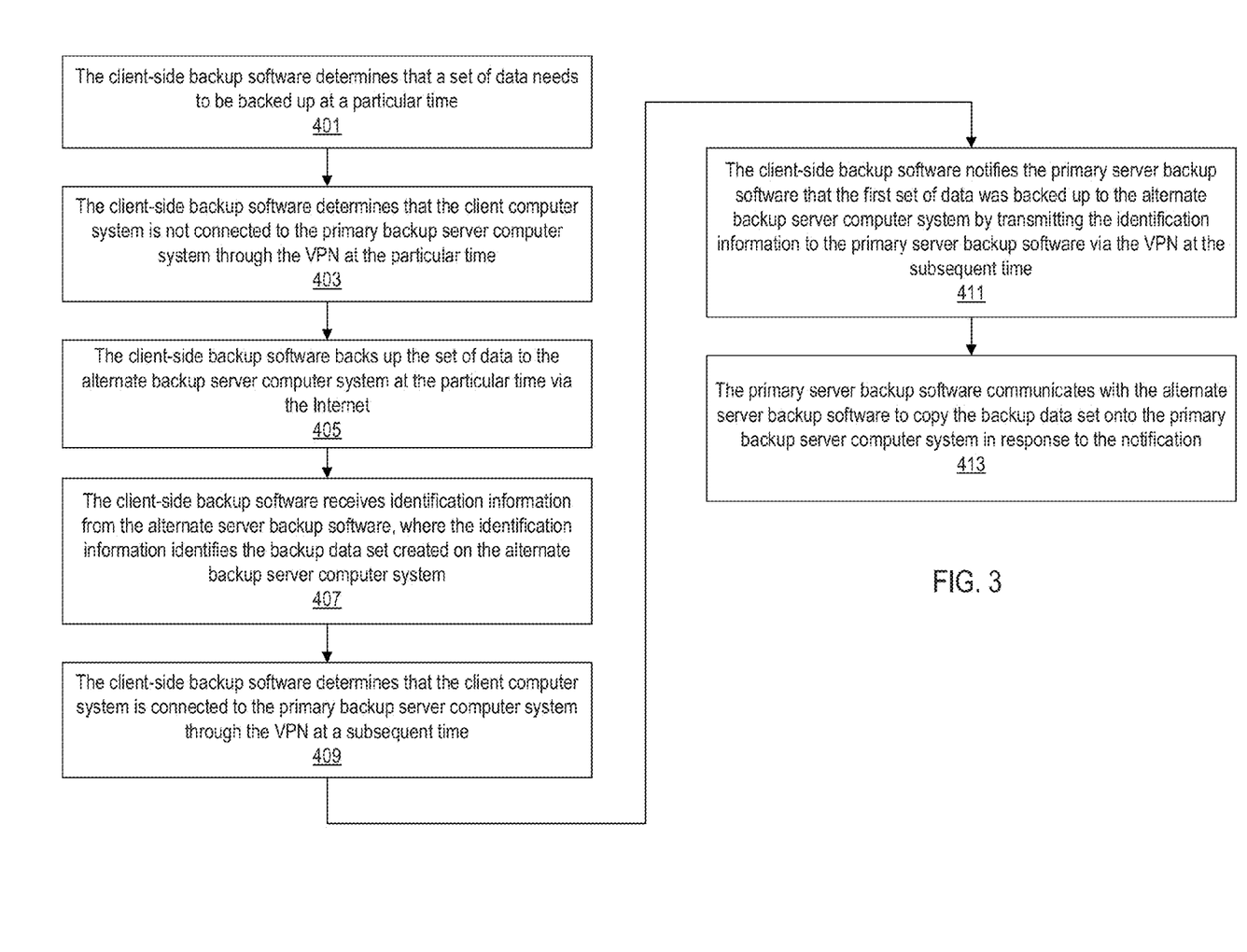
FIG. 3 is a flowchart diagram illustrating one embodiment of a method for backing up a set of data from a particular client computer system.

FIG. 3 is a flowchart diagram illustrating one embodiment of a method for backing up a set of data from a particular client computer system 83. The method may be implemented by the client-side backup software 205 executing on the client computer system 83, the primary server backup software 206 executing on the primary backup server computer system 82, and the alternate server backup software 207 executing on the alternate backup server computer system 84.

As indicated in block 401, the client-side backup software 205 may determine that a set of data needs to be backed up at a particular time. As indicated in block 403, the client-side backup software 205 may also determine that the client computer system 83 is not currently connected to the primary backup server computer system 82 through the VPN 18 at the particular time. In response to determining that the client computer system 82 is not connected to the primary backup server computer system 82, the client-side backup software may initiate communication with the alternate server backup software 207 in order to backup the set of data to the alternate backup server computer system 84 at the particular time via the Internet.

In some embodiments, after the backup data set has been created on the alternate backup server computer system, the alternate server backup software 207 may transmit identification information to the client-side backup software 205, as indicated in block 407. The identification information may identify the backup data set created on the alternate backup server computer system 84, e.g., so that the alternate server backup software 207 can subsequently access the backup data set using the identification information, as described below.

At a subsequent time, the client-side backup software 205 may discover that the client computer system 83 is currently connected to the primary backup server computer system 82 through the VPN 18, as indicated in block 409. The client-side backup software 205 may then notify the primary server backup software 206 that the first set of data was backed up to the alternate backup server computer system 84 by transmitting the identification information to the primary server backup software 206 via the VPN 18, as indicated in block 411. In response to this notification, the primary server backup software 206 may initiate communication with the alternate server backup software 207 in order to copy the backup data set from the alternate backup server computer system 84 onto the primary backup server computer system 82. For example, the primary server backup software 206 may transmit the identification information received from the client-side backup software 205 to the alternate server backup software 207. The alternate server backup software 207 may then use the identification information to lookup the backup data set and then transmit the backup data set to the primary server backup software 206.

In an alternative embodiment the alternate server backup software 207 may automatically inform the primary server backup software 206 that the first set of data was backed up to the alternate backup server computer system 84 as soon as the backup operation initiated by the client-side backup software 205 completes. The primary server backup software 206 may then communicate with the alternate server backup software 207 to copy the backup data set onto the primary backup server computer system 82. In some embodiments the alternate server backup software 207 may automatically delete the backup data set after it has been copied to the primary backup server computer system 82.

In various embodiments the client-side backup software 205 on a given client computer system 83 may attempt to backup data to the primary backup server computer system 82 at various times. For example, in some embodiments the client-side backup software 205 may receive backup schedule information indicating times at which data on the client computer system 83 should be backed up. In some embodiments the backup schedule information may be transmitted to the client-side backup software 205 by the primary server backup software 206. For example, the primary server backup software 206 may act as a master controller that informs the various client computer systems 83 when their data should be backed up. In other embodiments the client-side backup software 205 may provide a graphical user interface that enables a user of the client computer system 83 to specify the backup schedule information.

At one particular time when the client-side backup software 205 is scheduled to perform a backup, the client-side backup software 205 may determine that a VPN connection to the primary backup server computer system 82 is currently available and may then communicate with the primary backup server computer system 82 to backup a data set to the primary backup server computer system 82. At another particular time when the client-side backup software 205 is scheduled to perform a backup, the client-side backup software 205 may determine that a VPN connection to the primary backup server computer system 82 is currently unavailable and may thus communicate with the alternate backup server computer system 84 to backup the data set to the alternate backup server computer system 84.

In some embodiments the client-side backup software 205 may begin backing up the data set in response to determining that a VPN connection to the primary backup server computer system 82 is currently available, but the VPN connection may be terminated before the data set finishes backing up to the primary backup server computer system 82. In response the client-side backup software 205 may re-start the backup operation to backup the data set to the alternate backup server computer system 84 instead.

In addition to performing backup operations at scheduled times, in some embodiments the client-side backup software 205 may enable a user of the client computer to manually request that a backup operation be initiated. For example, there may be times where it is convenient for a user to initiate a backup operation outside of a scheduled backup window. In some embodiments the user may request that data be backed up from the client computer system 83 to the alternate backup server computer system 84 even if the client computer system 83 is currently connected to the primary backup server computer system 82 via the VPN 18.

In various embodiments each client computer system 83 may be any type of computer system or computing device.

Figure 4:
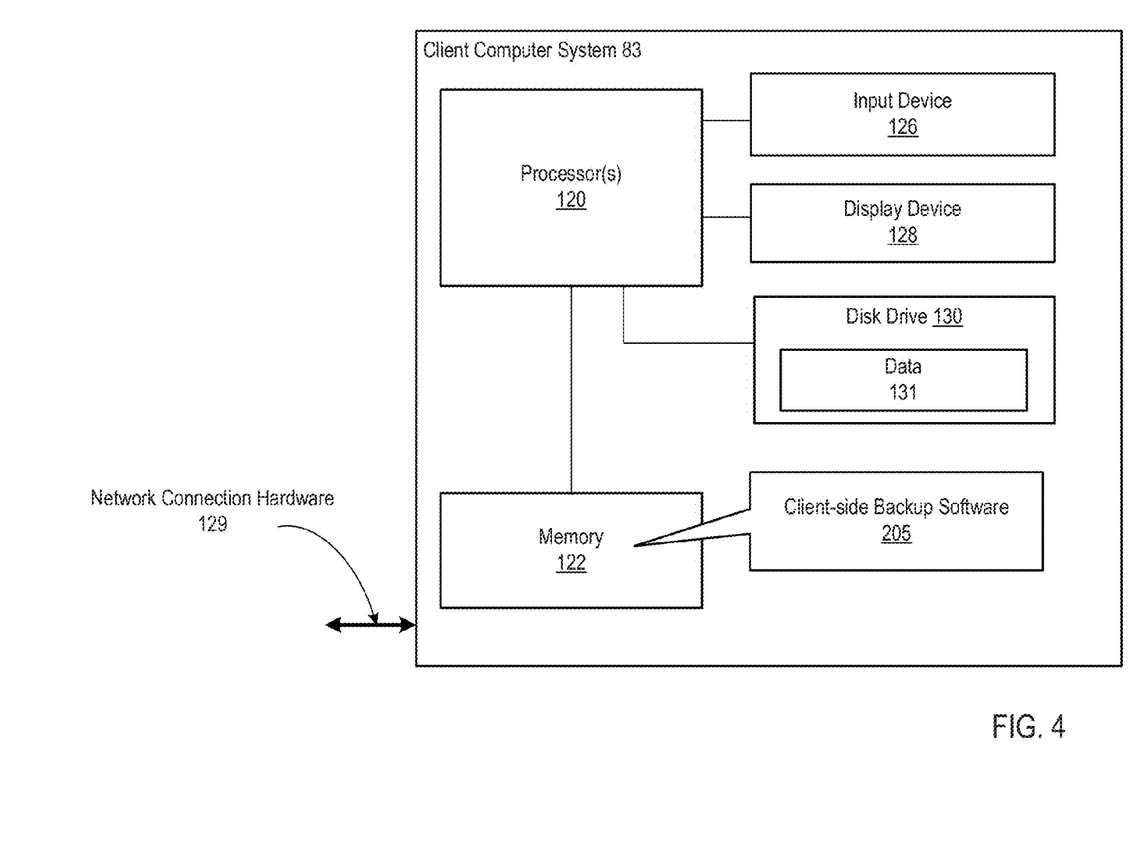
FIG. 4 illustrates an example of a client computer system according to some embodiments.

Examples include desktop computer systems, laptop computer systems, personal digital assistants, etc. FIG. 4 illustrates an example of a client computer system 83 according to some embodiments. It is noted that FIG. 4 is provided as an example, and in other embodiments the client computer system 83 may take on various other forms.

In this example, the client computer system 83 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the client-side backup software 205. The memory 122 may also store other software which operates in conjunction with or which is used by the client-side backup software 205, such as operating system software, file system software, network communication software, etc.

It is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the client computer system 83 may include multiple processors 120.

The client computer system 83 may include one or more disk drives 130 or other types of storage devices on which data 131 is stored. The data 131 includes data which the client-side backup software 205 is configured to backup.

The client computer system 83 may also include one or more input devices 126 for receiving user input to be provided to the client-side backup software 205, e.g., from a user of the client computer system 83. The input device(s) 126 may include any of various types of input devices, such as keyboards, keypads, microphones, or pointing devices (e.g., a mouse or trackball). The client computer system 83 may also include one or more output devices 128 for displaying output to the user. The output device(s) 128 may include any of various types of output devices or display devices, such as LCD screens or monitors, CRT monitors, etc. The client computer system 83 may also include network connection hardware 129 through which the client computer system 83 can connect to the Internet 19 and the VPN 18.

Figure 5:
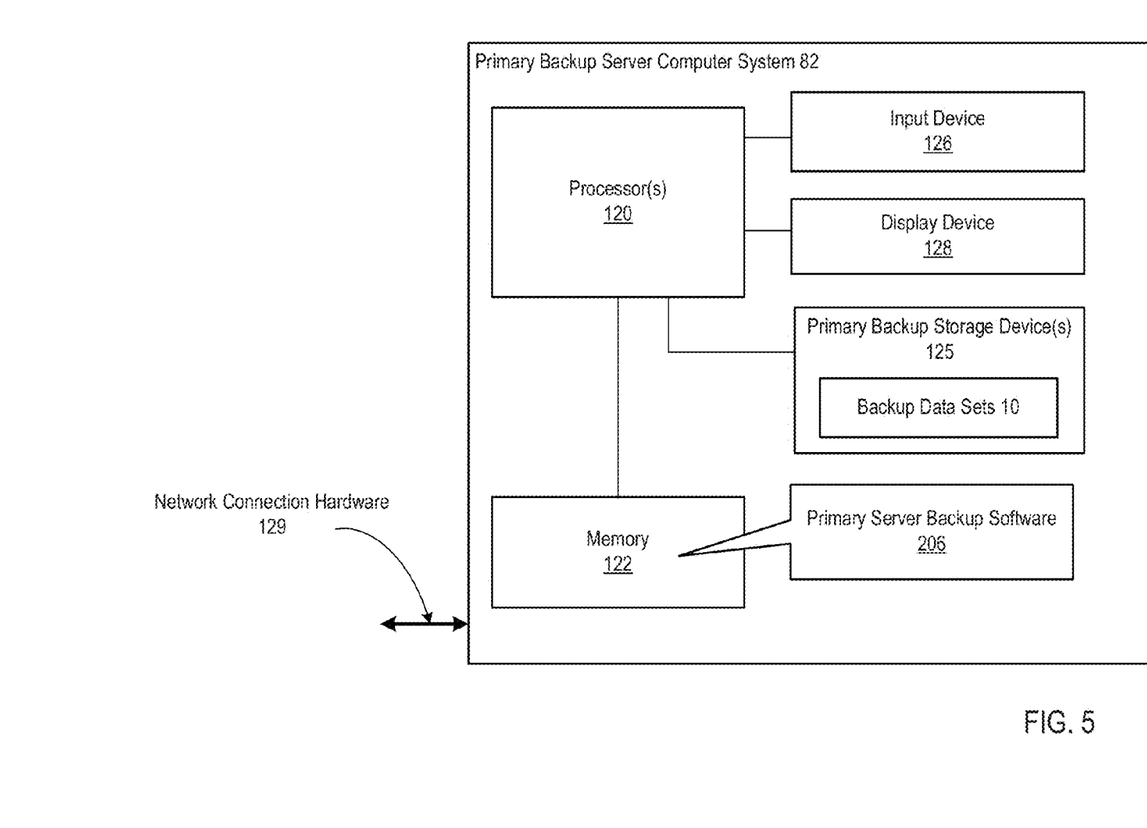
FIG. 5 illustrates an example of a primary backup server computer system according to some embodiments.

In various embodiments the primary backup server computer system 82 may include any type of computer systems or computing devices. In some embodiments the primary backup server computer system 82 may include multiple physical computers or nodes. FIG. 5 illustrates an example of a primary backup server computer system 82 according to some embodiments. It is noted that FIG. 5 is provided as an example, and in other embodiments the primary backup server computer system 82 may take on various other forms.

In this example, the primary backup server computer system 82 includes one or more processors 120 coupled to memory 122. The memory 122 may be configured to store program instructions and/or data. In particular, the memory 122 may store the primary server backup software 206.

The primary backup server computer system 82 may include one or more primary backup storage devices 125 on which the backup data sets 10 are stored. In various embodiments the one or more primary backup storage devices 125 may include any kind of storage device(s). Examples of primary backup storage devices 125 that may be used in various embodiments include tape drives (e.g., devices operable to store data on tape cartridges), disk storage units (e.g., devices including one or more disk drives), optical storage devices (e.g., devices operable to store data on optical media), flash memory storage devices, etc.

Also, in various embodiments the one or more primary backup storage devices 125 may be included in or coupled to the primary backup server computer system 82 in any of various ways. For example, in some embodiments the one or more primary backup storage devices 125 may be directly attached to one or more physical computers in the primary backup server computer system 82 or may couple to the one or more physical computers through one or more communication buses. In other embodiments the primary backup server computer system 82 may communicate with the one or more primary backup storage devices 125 through any type of network or combination of networks. For example, the network may include any type or combination of local area network (LAN), a wide area network (WAN), wireless networks, an Intranet, the Internet, storage area network (SAN), etc.

The primary backup server computer system 82 may also include one or more input devices 126 for receiving user input to be provided to the primary server backup software 206, e.g., from an administrator of the primary backup server computer system 82. The primary backup server computer system 82 may also include one or more output devices 128 for displaying output to the administrator. The primary backup server computer system 82 may also include network connection hardware 129 through which the primary backup server computer system 82 can connect to one or more networks.

Figure 6:
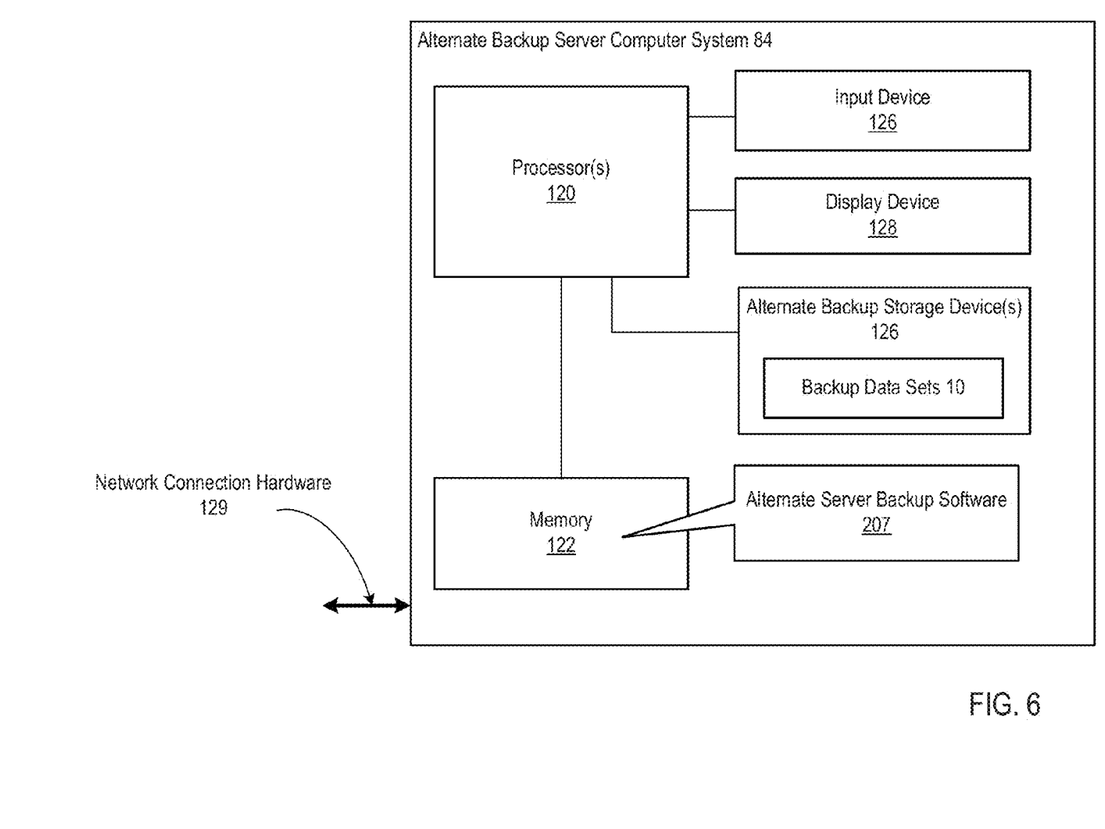
FIG. 6 illustrates an example of an alternate backup server computer system according to some embodiments.

In various embodiments the alternate backup server computer system 84 may include any type of computer systems or computing devices. In some embodiments the alternate backup server computer system 84 may include multiple physical computers or nodes. FIG. 6 illustrates an example of an alternate backup server computer system 84 according to some embodiments. It is noted that FIG. 6 is provided as an example, and in other embodiments the alternate backup server computer system 84 may take on various other forms. In this example the alternate backup server computer system 84 includes various elements similar to those discussed above with reference to FIG. 5. However, in this case the memory stores the alternate server backup 207 which executes to store backup data sets 10 on one or more alternate backup storage device(s) 126.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a client computer system;
   a privately accessible primary backup server computer system accessible to the client computer system via a virtual private network (VPN); and
   an alternate backup server computer system accessible to the client computer system via the Internet;
   wherein a first set of data is scheduled to be backed up from the client computer system to the primary backup server computer system via the VPN at a particular time, wherein the client computer system is configured to backup the first set of data to the alternate backup server computer system via the Internet at the particular time instead of backing up the first set of data to the primary backup server computer system via the VPN in response to determining that the client computer system is not able to access the VPN at the particular time;
   wherein the alternate backup server computer system is configured to notify the primary backup server computer system that the first set of data was backed up to the alternate backup server computer system in response to the client computer system backing up the first set of data to the alternate backup server computer system, wherein in said notifying the primary backup server computer system, the alternate computer system is configured to transmit identification information identifying the first set of data to the primary backup server computer system, wherein the identification information includes information identifying the client computer system and information indicating the particular time when the first set of data was backed up to the alternate backup server computer system; and
   wherein the primary backup server computer system is configured to:
      receive the notification from the alternate backup computer system, wherein receiving the notification includes receiving the identification information;
      communicate with the alternate backup server computer system in response to the notification in order to transfer the first set of data from the alternate backup server computer system to the primary backup server computer system; and
      store the first set of data in association with the client computer system.

2. The system of claim 1,
   wherein the client computer system is one of a plurality of client computer systems;
   wherein each respective client computer system of the plurality of client computer systems is scheduled to backup respective data from the respective client computer system to the primary backup server computer system via the VPN at a respective scheduled time; and
   wherein each respective client computer system of the plurality of client computer systems is configured to backup the respective data from the respective client computer system to the alternate backup server computer system instead of the primary backup server computer system if the respective client computer system is not able to access the VPN at the respective scheduled time.

3. The system of claim 1,
   wherein the client computer system is a mobile computer system that is not able to access the VPN at the particular time due to being moved to a particular location from which the mobile computer system does not have access to the VPN.

4. The system of claim 3,
   wherein the mobile computer system and the privately accessible primary backup server computer system both belong to a business organization, wherein the business organization provides the privately accessible primary backup server computer system to enable mobile computer systems of the business organization to securely backup data via the VPN.

5. The system of claim 1,
   wherein the particular time is a first time; and
   wherein the client computer system is further configured to receive backup schedule information indicating times at which data on the client computer system should be backed up, wherein a second set of data is scheduled to be backed up at a second particular time; and
   wherein the client computer system is configured to backup the second set of data to the primary backup server computer system via the VPN in response to determining that the client computer system is able to access the VPN at the second particular time.

6. The system of claim 1,
   wherein the client computer system is configured to backup the first set of data to the alternate backup server computer system via a Software As a Service (SaaS) interface provided by the alternate backup server computer system.

7. The system of claim 1,
   wherein the client computer system is configured to transmit authentication information to the alternate backup server computer system to receive authorization to backup the first set of data to the alternate backup server computer system.

8. The system of claim 1,
   wherein the alternate backup server computer system is further configured to delete the first set of data from the alternate backup server computer system after the first set of data has been transferred to the primary backup server computer system.

9. The system of claim 1,
   wherein the alternate backup server computer system is further configured to keep the first set of data stored on the alternate backup server computer system after the first set of data has been transferred to the primary backup server computer system.

10. The system of claim 1, wherein the client computer system is further configured to:
    begin a backup of a second set of data to the primary backup server computer system via the VPN; and
    restart the backup of the second set of data to backup the second set of data to the alternate backup server computer system instead of the primary backup server computer system in response to detecting that the client computer system became disconnected from the VPN while backing up the second set of data to the primary backup server computer system.

11. The system of claim 1,
    wherein the client computer system is further configured to digitally sign the first set of data prior to backing up the first set of data to the alternate backup server computer system.

12. A method comprising:

configuring a client computer system with backup schedule information indicating that the client computer system should backup a first set of data at a particular time to a privately accessible primary backup server computer system via a virtual private network (VPN);

in response to the client computer system determining that the client computer system is not able to access the VPN at the particular time, the client computer system backing up the first set of data to an alternate backup server computer system via the Internet instead of backing up the first set of data to the primary backup server computer system via the VPN;

the alternate backup server computer system notifying the primary backup server computer system that the first set of data was backed up to the alternate backup server computer system in response to the client computer system backing up the first set of data to the alternate backup server computer system, wherein in said notifying the primary backup server computer system, the alternate computer system transmits identification information identifying the first set of data to the primary backup server computer system, wherein the identification information includes information identifying the client computer system and information indicating the particular time when the first set of data was backed up to the alternate backup server computer system;

the primary backup server computer system receiving the notification from the alternate backup computer system, wherein receiving the notification includes receiving the identification information;

the primary backup server computer system communicating with the alternate backup server computer system in response to the notification in order to transfer the first set of data from the alternate backup server computer system to the primary backup server computer system; and the primary backup server computer system storing the first set of data in association with the client computer system.

13. The method of claim 12, wherein the client computer system is one of a plurality of client computer systems, wherein the method further comprises:

scheduling each respective client computer system of the plurality of client computer systems to backup respective data from the respective client computer system to the primary backup server computer system via the VPN at a respective scheduled time; and each respective client computer system of the plurality of client computer systems backing up the respective data from the respective client computer system to the alternate backup server computer system instead of the primary backup server computer system in response to the respective client computer system determining that the respective client computer system is not able to access the VPN at the respective scheduled time.

14. The method of claim 12, wherein the particular time is a first time, wherein the method further comprises:

storing on the client computer system backup schedule information indicating times at which data on the client computer system should be backed up, wherein a second set of data is scheduled to be backed up at a second particular time; and the client computer system backing up the second set of data to the primary backup server computer system via the VPN in response to determining that the client computer system is able to access the VPN at the second particular time.

15. The method of claim 12, wherein the client computer system backs up the first set of data to the alternate backup server computer system via a Software As a Service (SaaS) interface provided by the alternate backup server computer system.

16. The method of claim 12, further comprising:

the alternate backup server computer system deleting the first set of data from the alternate backup server computer system after the first set of data has been transferred to the primary backup server computer system.

17. The method of claim 12, further comprising:

the client computer system beginning a backup of a second set of data to the primary backup server computer system via the VPN; and the client computer system restarting the backup of the second set of data to backup the second set of data to the alternate backup server computer system instead of the primary backup server computer system in response to detecting that the client computer system became disconnected from the VPN while backing up the second set of data to the primary backup server computer system.

18. A non-transitory computer-accessible storage medium, wherein the computer-accessible storage medium stores first program instructions executable by a client computer system to cause the client computer system to perform operations including:

receiving backup schedule information scheduling a first set of data to be backed up from the client computer system to a privately accessible primary backup server computer system via a virtual private network (VPN) at a particular time; and in response to determining that the client computer system is not able to access the VPN at the particular time, backing up the first set of data to an alternate backup server computer system via the Internet instead of backing up the first set of data to the primary backup server computer system via the VPN;

wherein the computer-accessible storage medium further stores second program instructions executable by the alternate backup server computer system to cause the alternate backup server computer system to perform operations including:

notifying the primary backup server computer system that the first set of data was backed up to the alternate backup server computer system in response to the client computer system backing up the first set of data to the alternate backup server computer system, wherein the second program instructions are executable by the alternate backup server computer system to cause the alternate backup server computer system to transmit identification information identifying the first set of data to the primary backup server computer system in said notifying the primary backup server computer system, wherein the identification information includes information identifying the client computer system and information indicating the particular time when the first set of data was backed up to the alternate backup server computer system; and wherein the computer-accessible storage medium further stores third program instructions executable by the primary backup server computer system to cause the primary backup server computer system to perform operations including:

receiving the notification from the alternate backup computer system, wherein receiving the notification includes receiving the identification information;

communicating with the alternate backup server computer system in response to the notification in order to transfer the first set of data from the alternate backup server computer system to the primary backup server computer system; and storing the first set of data in association with the client computer system.

* * * * *